United States Patent
Narendran et al.

(10) Patent No.: US 10,609,708 B1
(45) Date of Patent: Mar. 31, 2020

(54) USE OF TDD SPECIAL SUBFRAME FOR TRANSMISSION OF SMALL QUANTITY OF DATA

(71) Applicant: Sprint Spectrum L.P., Overland Park, KS (US)

(72) Inventors: Rajveen Narendran, Olathe, KS (US); Ravi Kallepalli, Overland Park, KS (US); Ryan P. Dreiling, Shawnee, KS (US); Christopher Bailey, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 144 days.

(21) Appl. No.: 15/634,511

(22) Filed: Jun. 27, 2017

(51) Int. Cl.
*H04W 72/04* (2009.01)
*H04L 5/14* (2006.01)
*H04W 4/70* (2018.01)
*H04L 5/00* (2006.01)

(52) U.S. Cl.
CPC ........... *H04W 72/0446* (2013.01); *H04L 5/14* (2013.01); *H04W 4/70* (2018.02); *H04L 5/0048* (2013.01)

(58) Field of Classification Search
CPC ..... H04L 5/0048; H04L 5/14; H04L 27/2605; H04L 5/0053; H04L 27/0006; H04L 5/001; H04L 5/1469; H04W 72/0406; H04W 72/14; H04W 72/0446
See application file for complete search history.

(56) References Cited

U.S. PATENT DOCUMENTS

| | | | |
|---|---|---|---|
| 2012/0113875 A1 | 5/2012 | Alanara et al. | |
| 2014/0044056 A1* | 2/2014 | Chen | H04W 72/04 370/329 |
| 2018/0007688 A1* | 1/2018 | Fu | H04L 5/0048 |
| 2018/0132257 A1* | 5/2018 | Golitschek Edler von Elbwart | H04L 5/1469 |
| 2018/0241499 A1* | 8/2018 | Einhaus | H04L 1/00 |

\* cited by examiner

*Primary Examiner* — Oussama Roudani

(57) ABSTRACT

A method and system to help control transmission over an air interface from a base station to a served WCD. When the base station has a threshold small quantity of data to transmit over the air to a WCD, the base station will schedule the transmission to occur in a downlink PRB of a special subframe, rather than in a PRB of a regular downlink subframe. As the downlink PRB of the special subframe likely has fewer useable resource elements than the PRB of the regular downlink subframe, this process could help to minimize waste of air interface resources resulting from not making use of resource elements in an allocated PRB.

16 Claims, 5 Drawing Sheets

USE OF TDD SPECIAL SUBFRAME FOR TRANSMISSION OF SMALL QUANTITY OF DATA

BACKGROUND

A typical cellular wireless network includes a number of base stations that radiate to define wireless coverage areas, such as cells and cell sectors, in which wireless client devices (WCDs) such as cell phones, tablet computers, tracking devices, embedded wireless modules, and other wirelessly equipped devices, can operate. Each base station may then be coupled with network infrastructure that provides connectivity with one or more transport networks, such as the public switched telephone network (PSTN) and/or the Internet for instance. With this arrangement, a WCD within coverage of the cellular wireless network may engage in air interface communication with a base station and may thereby communicate via the base station with various remote network entities or with other WCDs served by the base station.

Such a network could operate in accordance with a particular air interface protocol, with communications from the base stations to WCDs defining a downlink and communications from the WCDs to the base stations defining an uplink. Examples of existing air interface protocols include, without limitation, Long Term Evolution (LTE) (using Orthogonal Frequency Division Multiple Access (OFDMA) on the downlink and Single Carrier Frequency Division Multiple Access (SC-FDMA) on the uplink), Code Division Multiple Access (CDMA) (e.g., 1×RTT and 1×EV-DO), Global System for Mobile Communications (GSM), and Wi-Fi, among others. Each technology may define its own procedures for managing communications with WCDs.

In accordance with the air interface protocol, each coverage area could operate on a carrier (carrier frequency), which could be frequency division duplex (FDD) or time division duplex (TDD). An FDD carrier would use separate frequency channels for downlink and uplink communication, whereas a TDD carrier would use a single frequency channel multiplexed over time between downlink and uplink use. In either case, the downlink and uplink would each typically span a particular frequency bandwidth, defining within the frequency bandwidth various air interface resources for carrying communications between the base station and served WCDs. Further, the air interface resources could be grouped or otherwise structured to define various logical channels for carrying control signaling and bearer traffic (e.g., application-layer traffic) between the base station and WCDs.

When a base station serves WCDs in such an arrangement, the base station could coordinate transmission of data over the air between the base station and the WCDs. For instance, when the base station receives data destined to a WCD, the base station could select downlink air interface resources to carry the data and could coordinate transmission of the data over the air to the WCD within those resources. And when a WCD has data to transmit, the WCD could send a scheduling request to the base station, and the base station could responsively select uplink air interface resources to carry the data and could coordinate transmission of the data over the air from the WCD within those resources.

OVERVIEW

In a system that supports TDD operation, each coverage area that operates on a TDD carrier could be configured with a frame structure that has a TDD configuration (frame configuration) defining a sequence of equal-duration subframes and establishing which subframes are for downlink use and which subframes are for uplink use. Further, to help avoid interference issues that could result when such an air interface transitions from downlink to uplink, the TDD configuration could designate a special subframe (SSF) for each such transition, with the SSF being subdivided over time into a downlink portion (for transition from the preceding downlink subframe), a guard portion (unused), and an uplink portion (for transition to the succeeding uplink subframe).

By way of example, an LTE coverage area operating on a TDD carrier typically defines a continuum of 10-millisecond frames each divided into ten 1-millisecond subframes, and the carrier has a TDD configuration that establishes for each subframe per frame whether the subframe is a downlink subframe (D), an uplink subframe (U), or an special subframe (S). For instance, the TDD configuration could be {D, S, U, U, D, D, S, U, U, D} or {D, S, U, D, D, D, S, U, D, D}, among other possibilities. Further, the base station that provides such coverage could broadcast a system information message that species details of the TDD configuration, to enable served WCDs to operate accordingly.

With such an arrangement, the air interface could be structured to define resources in each subframe for carrying communications between the base station and served WCDs as noted above. For example, each 1-millisecond subframe in an LTE coverage area is divided over time into fourteen symbol time segments of about 67 microseconds each, and the carrier bandwidth within each subframe is be divided over frequency into 15 kHz subcarriers, such that the subframe defines an array of resource elements each occupying a 15 kHz subcarrier and spanning about 67 microseconds. These resource elements could then be modulated using a suitable modulation scheme, to carry signaling or bearer traffic between the base station and WCDs.

Further, on the downlink, these resource elements could be divided over time to define a control-region and traffic-channel region, and the traffic-channel intervals could be divided over frequency into equal-bandwidth groups of resource elements defining physical resource blocks (PRBs).

In LTE, for instance, in each downlink subframe and in the downlink portion of each special subframe, the first one, two, or three symbol time segments bandwidth-wide are generally reserved to define a control-region for carrying control signaling (such as scheduling directives), and the remaining symbol time segments bandwidth-wide are generally reserved to define a physical downlink shared channel (PDSCH) for carrying scheduled data communications from the base station to served WCDs. The PDSCH is then divided over frequency into 12-subcarrier-wide PRBs (each 180-kHz wide), which could be the smallest unit allocable for downlink transmission to a WCD.

When a base station receives data for transmission to a WCD, the base station could apply a scheduling process by which the base station selects and allocates one or more PRBs in an upcoming subframe for carrying the data to the WCD. In that subframe, the base station could then transmit to the WCD in the control-region a scheduling directive specifying which one or more resource-block segments carry the data, and the base station could transmit the data to the WCD within the specified resource block segment(s) by modulating the data on the resource elements of the specified PRB(s).

While this process could work well in many cases, an efficiency issue could arise in a situation where the base station has a very small quantity of data to send to a WCD. In particular, where PRBs are the smallest allocable unit of air interface resources, the base station could encounter a situation where the data that the base station has for transmission to a WCD would not fill up even a single PRB in a downlink subframe. Faced with this situation, the base station's allocation of a single PRB to carry data to the WCD could result in a waste of limited resources, as a portion of the PRB would go unused.

This situation could arise, by way of example, if WCD is a Machine-Type-Communication (MTC) device or class-1 device, which may regularly receive very small quantities of data, such as simple toggle commands, flags, or the like. Further, if the base station serves many such MTC devices at once, the problem could be magnified.

Disclosed herein is a method and system to help address this issue. In accordance with the disclosure, when a base station has a threshold small quantity of data to transmit over the air to a WCD, the base station will intentionally schedule the transmission to occur in a downlink PRB of a special subframe, rather than in a PRB of a regular downlink subframe. As the downlink portion of a special subframe is shorter in duration than a regular downlink subframe, the PDSCH of the downlink portion of a special subframe is likely shorter in duration than the PDSCH of a regular downlink subframe. As a result, the PRBs within the PDSCH of a special subframe are likely smaller than the PRBs within the PDSCH of a regular downlink subframe. And so, when the base station has a threshold small quantity of data for transmission to a WCD, it could be most efficient for the base station to transmit that data in a PRB of a special subframe rather than in PRB of a regular downlink subframe.

Accordingly, in one respect, disclosed is a method for controlling transmission of data over an air interface from a base station to a WCD served by the base station, where the air interface defines downlink time intervals including first intervals each having a first duration and second intervals each having a second duration shorter than the first duration. For instance, the first downlink time intervals could be regular downlink subframes (or perhaps PDSCH intervals of regular downlink subframes), and the second downlink time intervals could be the downlink portions of special subframes (or perhaps PDSCH intervals of the downlink portions of special subframes).

According to the disclosure, the method involves making a determination of whether a quantity of data queued for transmission from the base station to the WCD is threshold small. And the method then further includes, responsive to the determination being that the quantity of data queued for transmission from the base station to the WCD is threshold small, causing transmission of the data to occur within one of the second intervals rather than within one or more of the first intervals. For instance, responsive to a determination that the base station has a threshold small quantity of data for transmission to the WCD, the base station could transmit the data to the WCD in the downlink portion of a special subframe rather than in a regular downlink subframe.

In another respect, disclosed is a method for controlling transmission of data over a time TDD air interface from a base station to a WCD served by the base station, where the air interface is divided over time into a recurring sequence of equal-length subframes including one or more downlink subframes, one or more uplink subframes, and one or more special subframes, with each special subframe including a downlink interval and an uplink interval. According to the disclosure, the method involves making a determination of whether a quantity of data buffered at the base station for transmission to the WCD is threshold small. And the method then involves, responsive to the determination being that the quantity of data buffered at the base station for transmission to the WCD is threshold small, transmitting the data from the base station to the WCD in a special subframe rather than in a downlink subframe.

And in yet another respect, disclosed is a base station configured to control transmission of data over a TDD air interface to a WCD served by the base station, where the air interface is divided over time into a recurring sequence of equal-length subframes including one or more downlink subframes, one or more uplink subframes, and one or more special subframes each including a downlink interval and an uplink interval. According to the disclosure, the base station comprises a wireless communication interface configured to transmit and receive on the air interface. And the base station comprises a controller configured to carry out operations including (i) making a determination of whether a quantity of data buffered at the base station for transmission to the WCD is threshold small and (ii) responsive to the determination being that the quantity of data buffered at the base station for transmission to the WCD is threshold small, causing the wireless communication interface to transmit the data to the WCD in a special subframe rather than in a downlink subframe.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Features of the present disclosure will be described by way of example in the context of LTE. However, it will be understood that principles of the disclosure can extend to apply in other scenarios as well, such as with respect to other air interface protocols, other TDD configurations and the like. Further, numerous variations from the details disclosed may be possible. For instance, elements, arrangements, and operations may be added, removed, combined, distributed, or otherwise modified. In addition, operations described as being performed by one or more entities may be implemented in various ways, such as by a processing unit executing program instructions for instance.

Figure 1:
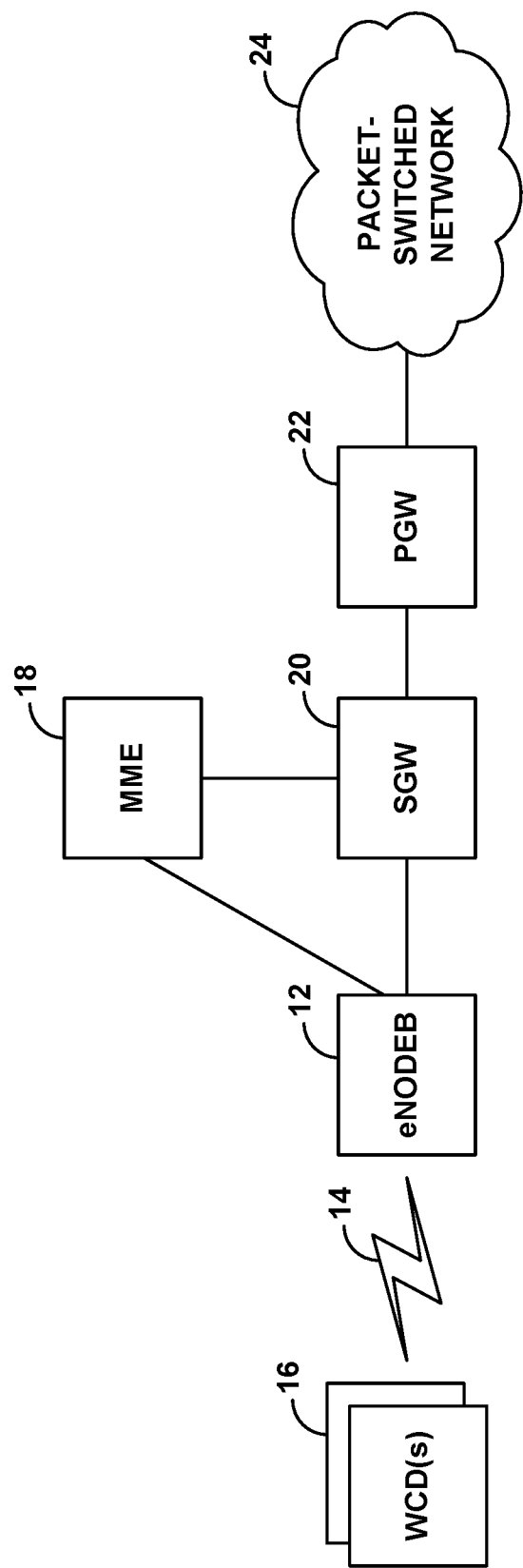
FIG. 1 is a simplified block diagram of an example wireless communication system in which features of the present disclosure can be implemented.

Referring to the drawings, as noted above, FIG. 1 is a simplified block diagram of a wireless communication system in which the various features of the present disclosure can be implemented. In particular, FIG. 1 depicts a representative LTE network 10, which functions primarily to serve WCDs with wireless packet data communication service, including possibly voice-over-packet service, but may also serve other functions.

As shown, the LTE network includes a base station (eNodeB) 12, which could include an antenna structure and transceiver that cooperatively work to provide an LTE cell 14 in which to serve WCDs 16. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

In a representative implementation, cell 14 operates on a TDD carrier that has a defined frequency bandwidth within a particular band. For example, the TDD carrier could have a 20 MHz bandwidth and could reside within LTE Band 41 (2496-2690 MHz), or the carrier could take other forms or be located within other bands. As shown, the air interface of cell 14 then defines a downlink interface 26 and an uplink interface 28, which are multiplexed over time in accordance with a TDD configuration of the cell.

Pursuant to LTE, as noted above, the air interface of cell 14 is divided over time into a continuum of 10-millisecond frames each made up of ten 1-millisecond subframes, and the TDD configuration designates each subframe as either a downlink subframe (D), an uplink subframe (U), or a special subframe (S) as noted above. For instance, the TDD configuration could be one of those shown in Table 1, wherein each TDD configuration is represented by a configuration number and defines a recurring sequence of subframes 0-9.

TABLE 1

LTE TDD Configurations

| TDD Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Further, the symbol time segments of each special subframe in the TDD configuration are divided into intervals defining, in order, a downlink portion (downlink pilot time slot, DwPTS), a guard period (GP), and an uplink portion (uplink pilot time slot, UpPTS). For instance, the SSF configuration could be one of those shown in Table 2, where each SSF configuration is represented by a respective configuration number and defines how many symbol time segments (symbols) there are respectively in the DwPTS, the GP, and the UpPTS.

TABLE 2

LTE SSF Configurations

| SSF Configuration | Number of symbols/subframe | | |
|---|---|---|---|
| | DwPTS | GP | UpPTS |
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |
| 9 | 6 | 6 | 2 |

While some of these SSF configurations have very small guard periods, an example implementation could have a sizeable guard period to help best avoid downlink-uplink interference issues. Thus, in practice, the DwPTS of an example SSF might span on the order of three to nine symbol time segments.

In operation, the eNodeB 12 could broadcast specifications of the TDD configuration and special subframe configuration, so that served WCDs can operate accordingly. For instance, the base station could include in a periodically broadcast System Information Block (SIB) message both (i) a specification of the TDD configuration by configuration number per Table 1, and (ii) a specification of the SSF configuration by SSF configuration number per Table 2.

As additionally noted above, each LTE subframe is divided into fourteen symbol time segments of about 67 microseconds each, and the carrier bandwidth is divided into subcarriers of 15 kHz each, thereby effectively defining an array of resource elements on which communications can be modulated using an appropriate modulation scheme.

Further, in each downlink subframe and in the DwPTS of each SSF, the symbol time segments are divided into a control region and a PDSCH, and the PDSCH is divided over the frequency bandwidth into 180 kHz wide PRBs individually allocable to carry data to WCDs. (Technically, each 1-ms LTE subframe is divided over time into two 0.5-ms timeslots each spanning 7 symbol time segments. Therefore, if the PDSCH is longer than 7 symbol time segments, each PRB as presently defined could encompass two groups of symbol time segments, one in the first timeslot, and the other in the second timeslot.)

Figure 2:
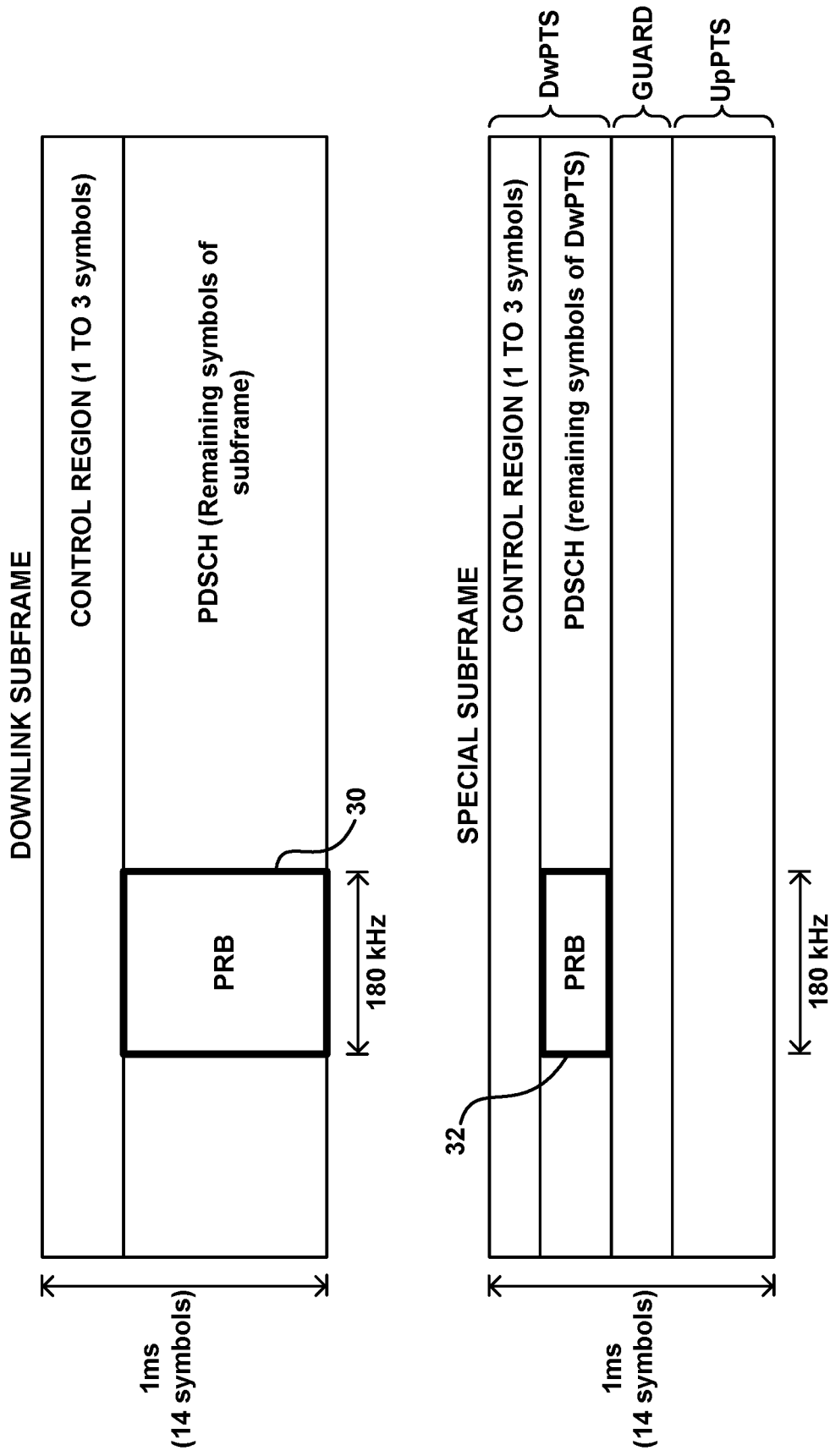
FIG. 2 is a depiction of example subframes, illustrating different sized downlink PRBs in a downlink subframe and a special subframe.

With this configuration, as noted above, the PDSCH of each regular downlink subframe would likely span more symbol time segments than the PDSCH of the DwPTS of each special subframe. As a result, even though each PRB would span 12 subcarriers, each PRB in a regular downlink subframe would likely encompass more resource elements than each PRB in the DwPTS of a special frame. FIG. 2 illustrates this arrangement, showing simplified diagrams of a representative downlink subframe and a representative special subframe.

In particular, as shown in FIG. 2, the downlink subframe and special subframe are each 1-ms long and are each divided over time into 14 symbol time segments. The downlink subframe is then divided over time into a control region spanning the first one to three symbol time segments, and a PDSCH spanning the remaining symbol time segments of the subframe. Whereas, the special subframe includes a DwPTS spanning just a first proper subset of the symbol time segments of the subframe, with the DwPTS then being divided into a control region the first one to three symbol time segments of the DwPTS, and a PDSCH spanning the remaining symbol time segments of the DwPTS.

Shown in the downlink subframe is then a representative PRB 30, which be 12 subcarriers wide and would span the number of symbol time segments that the PDSCH of the downlink subframe spans, thus defining a particular number of resource elements that can be modulated to carry data to a WCD. And shown in the special subframe is a representative PRB 32, which would also be 12 subcarriers wide but would span just the smaller number of symbol time segments that the PDSCH of the DwPTS spans, thus defining fewer resource elements that can be modulated to carry data to a WCD.

Referring back to FIG. 1, when a WCD 16 enters into coverage of eNodeB 12, the WCD could establish a radio-link-layer connection with the eNodeB 12 and could register for service with the network if it has not done so yet. Through this process, eNodeB 12 could also obtain information about WCD, such as WCD device type and capability information, and could store this information in a context or profile record for the WCD, for reference while serving the WCD. In an example implementation, this information could indicate whether the WCD is an MTC device (e.g., whether the WCD is a class-1 type device) and could indicate various other attributes as well.

Once so connected, the eNodeB could then coordinate data communication to the WCD as discussed above. Namely, when the eNodeB has data for transmission to the WCD, the eNodeB could allocate one or more PRBs to carry the data, the eNodeB could transmit to the WCD a scheduling directive (e.g., a downlink control information (DCI) message) specifying the allocated PRB(s), and the eNodeB could transmit the data to the WCD in the specified PRB(s) using an appropriate modulation scheme, for receipt of the data by the WCD.

To facilitate this in practice, the WCD could regularly transmit to the eNodeB a report of channel quality based on the WCD's evaluation of coverage strength and perhaps other parameters, and the eNodeB could select an appropriate modulation and coding scheme (MCS) based on the reported channel quality. For instance, the WCD could report channel quality as a channel quality indicator (CQI) value, and the eNodeB could map that CQI value to an MCS by reference to a CQI-MCS mapping table. In practice, the MCS could define a coding scheme that indicates how much error correction coding will be added to the data before transmission so as to produce a set of bits to be transmitted, and the MCS could also define a modulation scheme that indicates how many bits can be transmitted per resource element.

Based on the MCS, the eNodeB could thereby determine how many resource elements would be required for carrying the data to the WCD. And based on the number of useable resource elements per PRB (e.g., excluding resource elements that are reserved for other purposes such as to carry a reference signal or the like), the eNodeB could then further determine how many PRBs would be required for carrying the data to the WCD. The eNodeB could then select that number of PRBs in a given subframe, transmit to the WCD in the control region of that subframe a scheduling directive that specifies the MCS and the allocated PRB(s), and the eNodeB could transmit the data to the WCD in the specified PRB(s).

As noted above, there may be situations where the data an eNodeB has queued for transmission to a WCD would not even fill a single PRB of a regular downlink subframe. For instance, accounting for the quantity of error correction bits that may need to be added given the WCD's reported channel quality, and considering the modulation scheme and the number of useable resource elements in a PRB of a regular downlink subframe, the data that the eNodeB has for transmission to the WCD may just partially fill that PRB. As indicated above, this could occur, for instance, if the WCD is an MTC device that receives very small quantities of data, such as simple toggle commands, flags, or the like.

When faced with this situation, per the present disclosure, the eNodeB could help to improve efficiency by scheduling the data transmission to occur in the DwPTS of a special subframe, rather than in a regular downlink subframe. Namely, as the PRBs of in the DwPTS likely encompass fewer resource elements than the PRBs of in the regular downlink subframe, scheduling the small-quantity data transmission to occur in a PRB of the DwPTS could help minimize the number of unused resource elements.

At issue in this process could be whether the data that the eNodeB has for transmission to the WCD would fill even a single PRB in a regular downlink subframe. If so, then the eNodeB could schedule and engage in transmission of the data in that PRB. Whereas, if not, then the eNodeB could instead schedule and engage in the transmission in the PRB of the DwPTS of a special subframe instead. Further, given that MTC devices are likely to be subject to such small-quantity communication, the eNodeB could possibly carry out this process in response to determining that the WCD at issue is an MTC device, such as by referring to the WCD's profile or context record for instance.

Figure 3:
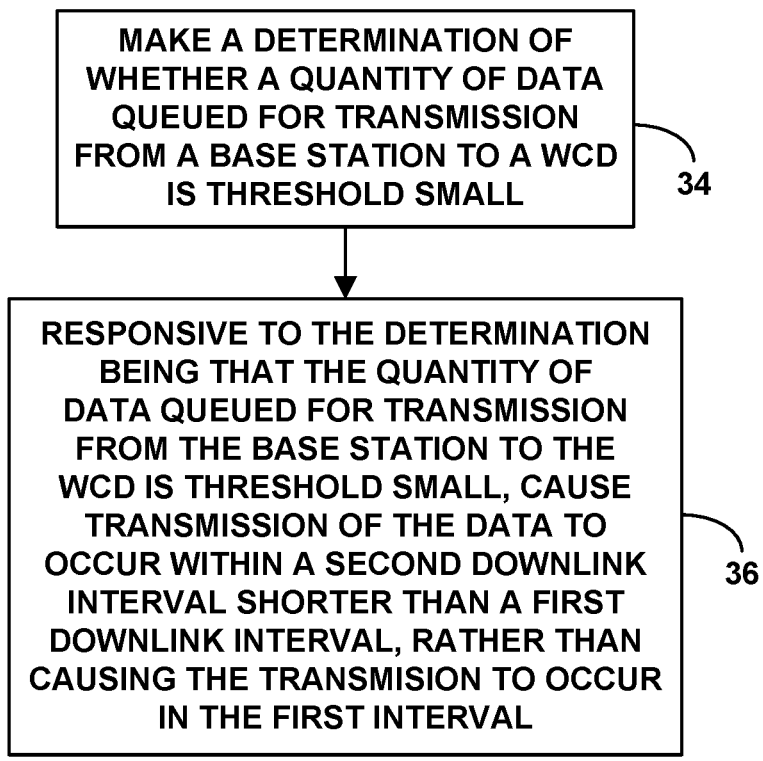
FIG. 3 is a flow chart depicting operations that can be carried out in accordance with the disclosure.

FIG. 3 is next a flow chart depicting a method that could be carried out in accordance with the discussion above, to control transmission of data over an air interface from a base station to a WCD served by the base station, where the air interface defines downlink time intervals including first intervals each having a first duration and second intervals each having a second duration shorter than the first duration. As noted above, by way of example, each first downlink interval could be the PDSCH interval of a regular downlink subframe, whereas each second downlink interval could be the PDSCH interval of the downlink portion of a special subframe, although other examples could be possible as well.

As shown in FIG. 3, at block 34, the method involves making a determination of whether a quantity of data queued for transmission from the base station to the WCD is threshold small. And at block 36, the method involves, responsive to the determination being that the quantity of data queued for transmission from the base station to the WCD is threshold small, causing transmission of the data to occur within one of the second intervals rather than within one or more of the first intervals. For instance, the base station could make a selection between causing the transmission to occur in a first interval or in a second interval, with the selection being based on the quantity of data queued for transmission; and based on the quantity being threshold small, the base station could thereby decide to cause the transmission to occur in a second interval.

In line with the discussion above, in each time interval, the air interface could be divide over frequency into allocable resource blocks (e.g., PRBs within a PDSCH), and the act of making the determination of whether the quantity of data queued for transmission from the base station to the WCD is threshold small could involve determining whether the quantity of data would fit within a single allocable resource block of one of the second intervals.

For instance, the single allocable resource block could define a quantity of resource elements useable to carry data transmission, and the act of determining whether the total of data would fit within the single allocable resource block could involve determining whether the quantity of data could be transmitted within that quantity of resource elements of the single allocable resource block. As discussed above, for example, the method could involve determining an MCS to use for transmission of the data (e.g., based on a quality of a communication channel between the base station and the WCD), in which case determining whether the quantity of data could be transmitted within the quantity of resource elements of the single allocable resource block could be based on the determined MCS.

Figure 4:
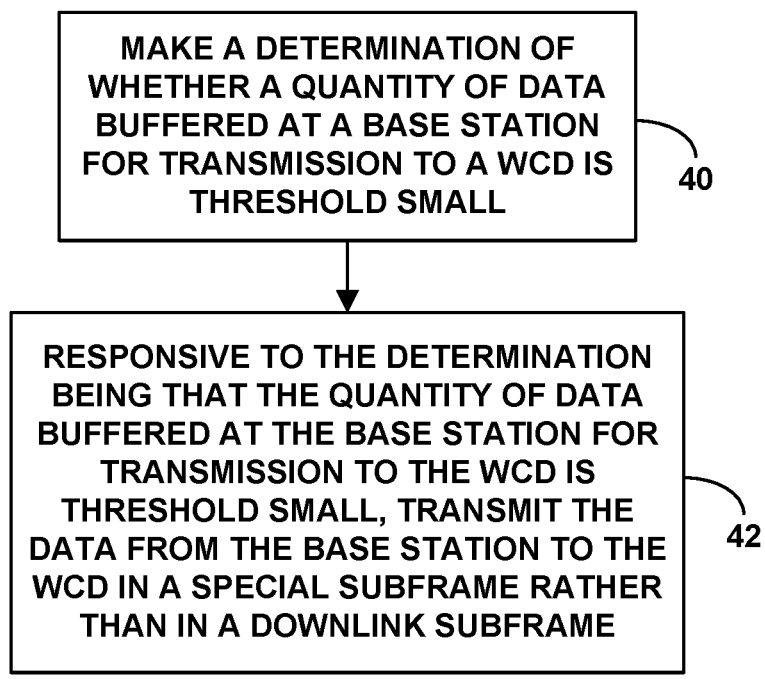
FIG. 4 is another flow chart depicting operations that can be carried out in accordance with the disclosure.

FIG. 4 is next a flow chart depicting a method that could be carried out in accordance with the discussion above, to control transmission of data over a TDD air interface from a base station to a WCD served by the base station, where the air interface is divided over time into a recurring sequence of equal-length subframes including one or more downlink subframes, one or more uplink subframes, and one or more special subframes, where each special subframe includes a downlink interval and an uplink interval. As shown in FIG. 4, at block 40, the method includes making a determination of whether a quantity of data buffered at the base station for transmission to the WCD is threshold small. And at block 42, the method includes, responsive to the determination being that the quantity of data buffered at the base station for transmission to the WCD is threshold small, transmitting the data from the base station to the WCD in a special subframe rather than in a downlink subframe.

In line with the discussion above, the air interface at issue in this method could be divided over frequency into equal-bandwidth resource-block segments (e.g., each 180 kHz in bandwidth, or each another bandwidth), and the act of making the determination of whether the quantity of data buffered for transmission to the WCD is threshold small could involve determining whether the quantity of data could be transmitted within a single resource-block segment of the downlink interval of the SSF (e.g., within a single PRB of a PDSCH within a DwPTS of the SSF).

For instance, the single resource-block segment of the downlink interval of the SSF could define a quantity of resource elements useable to carry data transmission from the base station, and the act of determining whether the quantity of data buffered at the base station for transmission to the WCD could be transmitted within the single resource-block segment of the downlink interval of the SSF could involve determining whether the quantity of data could be transmitted within the quantity of resource elements of the single resource-block segment of the downlink interval of the SSF.

Further, the method could involve determining an MCS for transmission of the buffered data to the WCD (e.g., the base station receiving from the WCD one or more channel quality reports representing quality of a communication channel between the base station and the WCD, and determining the MCS based on the received one or more channel quality reports). And the act of determining whether the quantity of data could be transmitted within the quantity of resource elements of the single resource-block segment of the downlink interval of the SSF could be based on the determined MCS (e.g., based on a consideration of how much data could be sent per resource element, given the MCS).

Various other aspects discussed above could be incorporated in this method, and vice versa. For instance, this method could be carried out in response to the WCD being a MTC device. Further, the act of transmitting the data from the base station to the WCD in an SSF rather than in a downlink subframe could involve (i) transmitting from the base station to the WCD, within the SSF, a downlink control information message that designates a portion of the SSF that carries the data from the base station to the WCD, and (ii) transmitting the data from the base station to the WCD in the designated portion of the SSF.

Figure 5:
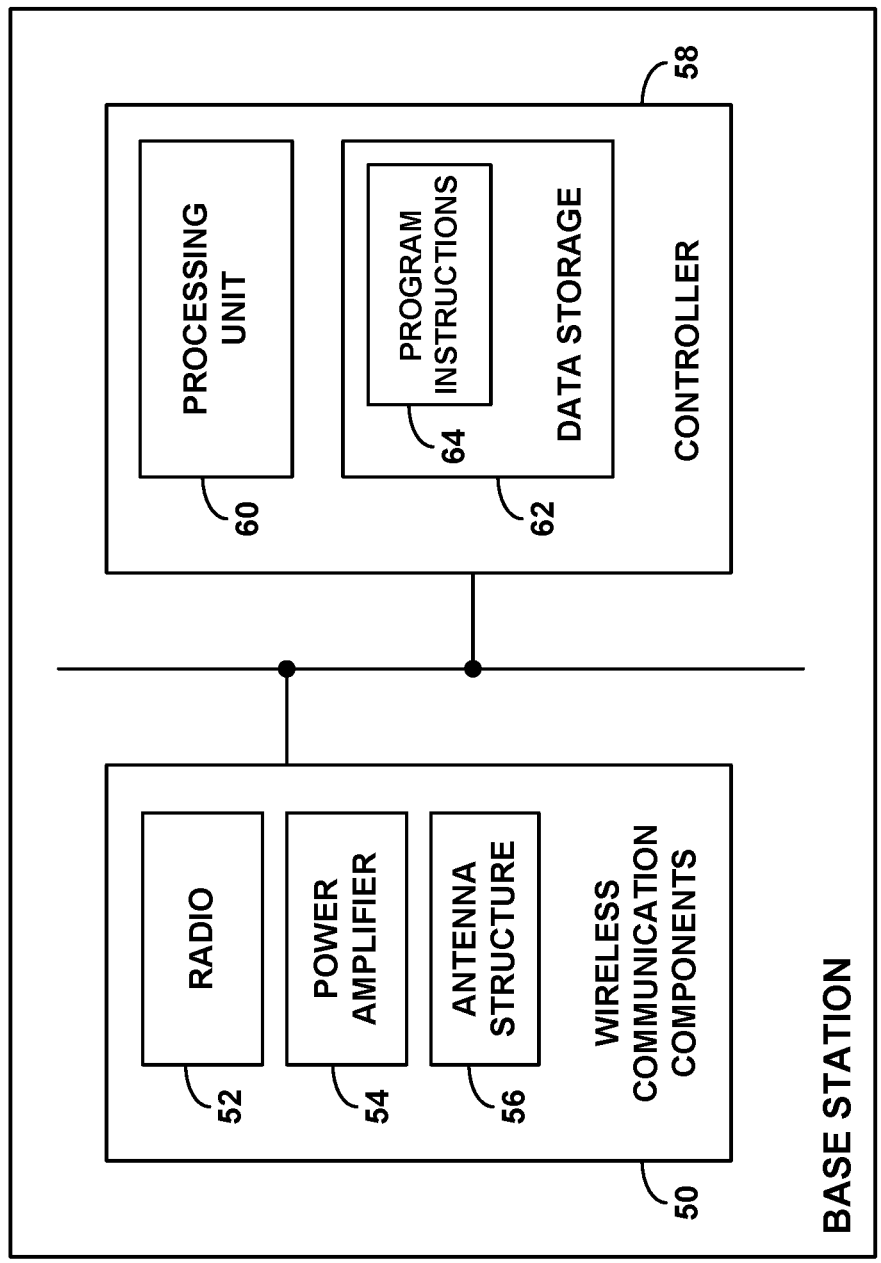
FIG. 5 is a simplified block diagram of a base station operable in accordance with the disclosure.

Finally, FIG. 5 is a simplified block diagram of a base station that could be configured to operate in accordance with the present disclosure, to control transmission of data over a TDD air interface to a WCD served by the base station, where the air interface is divided over time into a recurring sequence of equal-length subframes including one or more downlink subframes, one or more uplink subframes, and one or more special subframes, with each special subframe including a downlink interval and an uplink interval. As a general matter, this base station could take various forms, examples of which include a macro base station, a small cell base station, a repeater, or the like.

As shown in FIG. 5, the base station includes a wireless communication interface 50, which could comprise a radio 52, a power amplifier 54, and antenna structure 56, cooperatively configured to provide the TDD air interface and to transmit and receive on the air interface.

Further, the base station includes a controller 58 operable to carry out (e.g., cause the base station to carry out) various features described here. Controller 58 could comprise a processing unit 60, non-transitory data storage 62, and program instructions 64 stored in the data storage and executable by the processor to carry out various features described herein, and could be integrated with the wireless communication interface (e.g. on a common chipset or other common component or components). And in operation, the controller could be configured to make a determination of whether a quantity of data buffered at the base station for transmission to the WCD is threshold small, and responsive to the determination being that the quantity of data buffered at the base station for transmission to the WCD is threshold small, cause the wireless communication interface to transmit the data to the WCD in a special subframe rather than in a downlink subframe.

Aspects described above can be applied in this context as well, and vice versa. For example, the air interface could be divided over frequency into equal-bandwidth resource-block segments, and wherein making the determination of whether the quantity of data buffered for transmission to the WCD is threshold small could involve determining whether the quantity of data could be transmitted within a single resource-block segment of the downlink interval of the special subframe. Further, the single resource-block segment of the downlink interval of the special subframe could defines a quantity of resource elements useable to carry data transmission from the base station, and the act of determining whether the quantity of data buffered at the base station for transmission to the WCD could be transmitted within the single resource-block segment of the downlink interval of the SSF could involve determining whether the quantity of data could be transmitted within the quantity of resource elements of the single resource-block segment of the downlink interval of the SSF.

As another example, the operations carried out by the controller could additionally include determining, based on channel quality for communication between the base station and the WCD, an MCS for transmission of the buffered data to the WCD, and the act of determining whether the quantity of data could be transmitted within the quantity of resource elements of the single resource-block segment of the downlink interval of the special subframe could be based on the determined MCS.

And as still another example, the act of causing the wireless communication interface to transmit the data from the base station to the WCD in a special subframe rather than in a downlink subframe could involve (i) causing the wireless communication interface to transmit to the WCD, within the special subframe, a scheduling directive that designates a portion of the SSF that carries the data from the base station to the WCD and (ii) causing the wireless communication interface to transmit the data to the WCD in the designated portion of the special subframe.

Exemplary embodiments have been described above. Those skilled in the art will understand, however, that changes and modifications may be made to these embodiments without departing from the true scope and spirit of the invention.

We claim:

1. A method for controlling transmission of data over an air interface from a base station to a wireless client device (WCD) served by the base station, wherein the air interface defines downlink time intervals including first intervals each having a first duration and second intervals each having a second duration shorter than the first duration, the method comprising:

making a determination of whether a quantity of data queued for transmission from the base station to the WCD is threshold small, wherein, in each time interval, the air interface is divided over frequency into allocable resource blocks, and wherein making the determination of whether the quantity of data queued for transmission from the base station to the WCD is threshold small comprises determining whether the quantity of data would fit within a single one of the allocable resource blocks of one of the second intervals; and responsive to the determination being that the quantity of data queued for transmission from the base station to the WCD is threshold small, causing transmission of the data to occur within one of the second intervals rather than within one or more of the first intervals.

2. The method of claim 1, wherein the single allocable resource block defines a quantity of resource elements useable to carry data transmission, and wherein determining whether the total of data would fit within the single allocable resource block comprises determining whether the quantity of data could be transmitted within the quantity of resource elements of the single allocable resource block.

3. The method of claim 2, further comprising determining a modulation and coding scheme (MCS) to use for transmission of the data, wherein determining whether the quantity of data could be transmitted within the quantity of resource elements of the single allocable resource block is based on the determined MCS.

4. The method of claim 3, wherein determining the MCS for transmission of the buffered data is based on a quality of a communication channel between the base station and the WCD.

5. A method for controlling transmission of data over a time division duplex (TDD) air interface from a base station to a wireless client device (WCD) served by the base station, wherein the air interface is divided over time into a recurring sequence of equal-length subframes including one or more downlink subframes, one or more uplink subframes, and one or more special subframes (SSFs) each including a downlink interval and an uplink interval, the method comprising:

making a determination of whether a quantity of data buffered at the base station for transmission to the WCD is threshold small; and responsive to the determination being that the quantity of data buffered at the base station for transmission to the WCD is threshold small, transmitting the data from the base station to the WCD in an SSF rather than in a downlink subframe, wherein the air interface is divided over frequency into equal-bandwidth resource-block segments, and wherein making the determination of whether the quantity of data buffered for transmission to the WCD is threshold small comprises determining whether the quantity of data could be transmitted within a single one of the resource-block segments of the downlink interval of the SSF.

6. The method of claim 5, wherein the single resource-block segment of the downlink interval of the SSF defines a quantity of resource elements useable to carry data transmission from the base station, and wherein determining whether the quantity of data buffered at the base station for transmission to the WCD could be transmitted within the single resource-block segment of the downlink interval of the SSF comprises determining whether the quantity of data could be transmitted within the quantity of resource elements of the single resource-block segment of the downlink interval of the SSF.

7. The method of claim 6, further comprising determining a modulation and coding scheme (MCS) for transmission of the buffered data to the WCD, wherein determining whether the quantity of data could be transmitted within the quantity of resource elements of the single resource-block segment of the downlink interval of the SSF is based on the determined MCS.

8. The method of claim 7, wherein determining the MCS for transmission of the buffered data to the WCD comprises:

receiving from the WCD, by the base station, one or more channel quality reports representing quality of a communication channel between the base station and the WCD; and determining the MCS based on the received one or more channel quality reports.

9. The method of claim 5, carried out in response to the WCD being a Machine-Type-Communication (MTC) device.

10. The method of claim 5, wherein transmitting the data from the base station to the WCD in an SSF rather than in a downlink subframe comprises:

transmitting from the base station to the WCD, within the SSF, a downlink control information (DCI) message that designates a portion of the SSF that carries the data from the base station to the WCD; and transmitting the data from the base station to the WCD in the designated portion of the SSF.

11. A base station configured to control transmission of data over a time division duplex (TDD) air interface to a wireless client device (WCD) served by the base station, wherein the air interface is divided over time into a recurring sequence of equal-length subframes including one or more downlink subframes, one or more uplink subframes, and one or more special subframes (SSFs) each including a downlink interval and an uplink interval, the base station comprising:

a wireless communication interface configured to transmit and receive on the air interface; and a controller configured to carry out operations including (i) making a determination of whether a quantity of data buffered at the base station for transmission to the WCD is threshold small and (ii) responsive to the determination being that the quantity of data buffered at the base station for transmission to the WCD is threshold small, causing the wireless communication interface to transmit the data to the WCD in an SSF rather than in a downlink subframe, wherein the air interface is divided over frequency into equal-bandwidth resource-block segments, and wherein making the determination of whether the quantity of data buffered for transmission to the WCD is threshold small comprises determining whether the quantity of data could be transmitted within a single one of the resource-block segments of the downlink interval of the SSF.

12. The base station of claim 11, wherein the controller comprises a processing unit, data storage, and program instructions stored in the data storage and executable by the processing unit to carry out the operations.

13. The base station of claim 11, wherein the controller is integrated with the wireless communication interface.

14. The base station of 13, wherein the single resource-block segment of the downlink interval of the SSF defines a quantity of resource elements useable to carry data transmission from the base station, and wherein determining whether the quantity of data buffered at the base station for transmission to the WCD could be transmitted within the single resource-block segment of the downlink interval of the SSF comprises determining whether the quantity of data could be transmitted within the quantity of resource elements of the single resource-block segment of the downlink interval of the SSF.

15. The base station of claim 14, wherein the operations further comprise determining, based on channel quality for communication between the base station and the WCD, a modulation and coding scheme (MCS) for transmission of the buffered data to the WCD, wherein determining whether the quantity of data could be transmitted within the quantity of resource elements of the single resource-block segment of the downlink interval of the SSF is based on the determined MCS.

16. The base station of claim 11, wherein causing the wireless communication interface to transmit the data from the base station to the WCD in an SSF rather than in a downlink subframe comprises:

causing the wireless communication interface to transmit to the WCD, within the SSF, a downlink control information (DCI) message that designates a portion of the SSF that carries the data from the base station to the WCD; and causing the wireless communication interface to transmit the data to the WCD in the designated portion of the SSF.

* * * * *